W. A. SPEAKMAN.
MIXING VALVE.
APPLICATION FILED MAY 11, 1914.
1,121,879.
Patented Dec. 22, 1914.
2 SHEETS—SHEET 1.
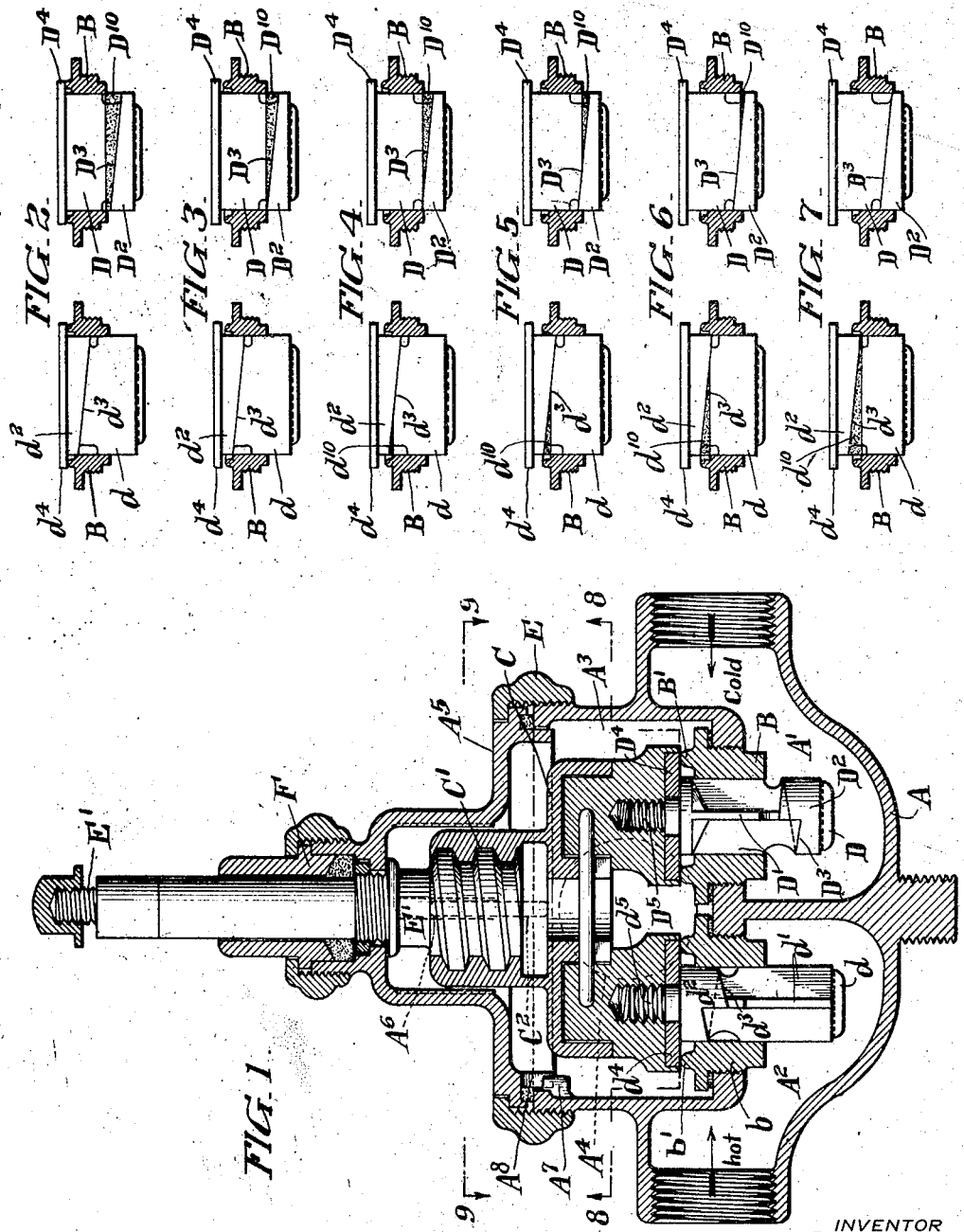
WITNESSES
INVENTOR
Willard A. Speakman
BY
ATTORNEY W. A. SPEAKMAN.
MIXING VALVE.
APPLICATION FILED MAY 11, 1914.
1,121,879.
Patented Dec. 22, 1914.
2 SHEETS—SHEET 2.
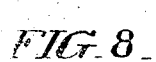
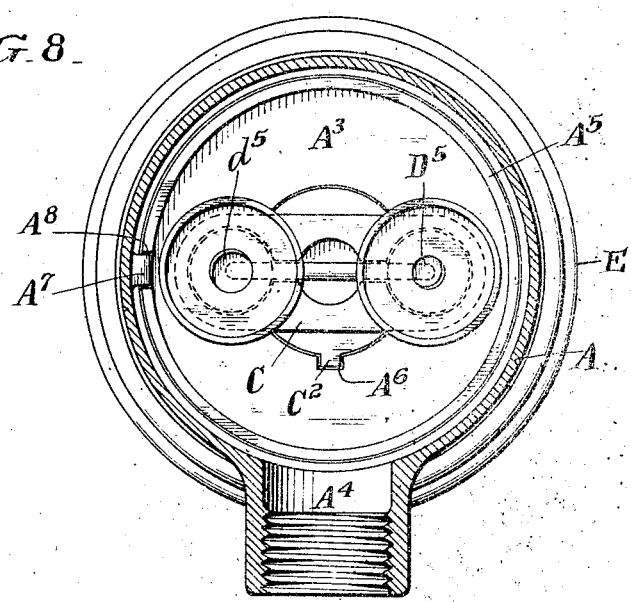
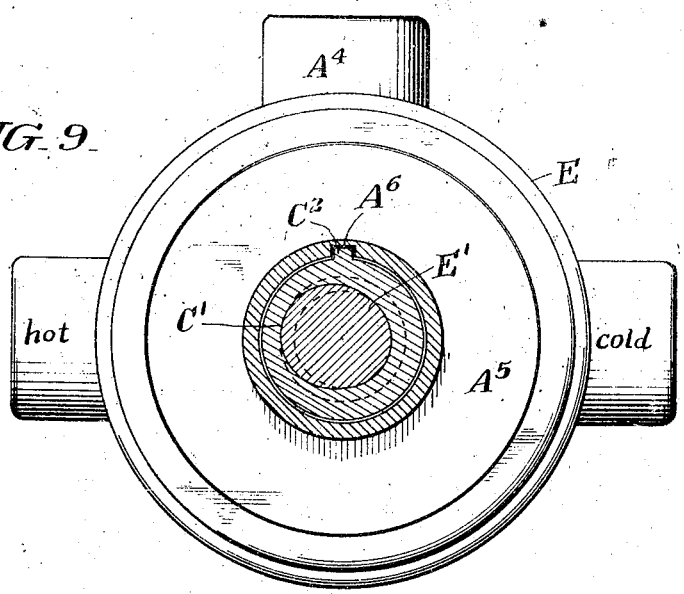
WITNESSES
INVENTOR
Willard A. Speakman
BY James T. Chambers
ATTORNEY

UNITED STATES PATENT OFFICE.

WILLARD A. SPEAKMAN, OF WILMINGTON, DELAWARE.

MIXING-VALVE.

1,121,879.

Specification of Letters Patent.

Patented Dec. 22, 1914.

Application filed May 11, 1914. Serial No. 837,884.

*To all whom it may concern:*

Be it known that I, WILLARD A. SPEAKMAN, a citizen of the United States of America, residing in Wilmington, in the county of New Castle, in the State of Delaware, have invented certain new and useful Improvements in Mixing-Valves, of which the following is a true and exact description, reference being had to the accompanying drawings, which form a part thereof.

My present invention consists in an improved valve for mixing two fluids, and is primarily devised for the purpose of providing a simple, effective and relatively inexpensive bath or lavatory valve for mixing hot and cold water so as to deliver a mixture at a desired temperature.

More particularly, my invention consists in an improved valve for the purpose specified, of the kind in which two inlet chambers, one for hot and the other for cold water, are connected to a common outlet chamber by separate passages or ports in each of which is located a corresponding plunger, the two plungers being connected and moving together as the valve is adjusted.

Considered from this aspect, my invention has for its object to so form the plungers that the ratio of the hot and cold water flowing may be varied in a gradual and uniform manner, as the plungers are moved back and forth between one position in which only cold water flows through the valve and another position in which only hot water passes through the valve. To accomplish this, I form the plungers each with a cylindrical cut off portion fitting snugly in the passage or port to which the plunger pertains, and terminating at one end in a helical cut off edge. With this arrangement, as the flow past either plunger varies between its maximum and minimum limits, the orifice between the cut off edge of the plunger and the wall of the passage in which the plunger works, changes in size but remains of the same shape,—a triangle when the peripheral surface of the plunger is developed. In consequence, the discharge through the orifice is practically proportional to its area, and varies uniformly with the movement of the plunger from one end to the other of its throttling stroke.

My improved valve also comprises provisions preventing the assembly of the valve parts with the two flow controlling plungers interchanged, so that the plunger designed to control the flow of the cold water actually controls the flow of hot water, and the hot water plunger controls the flow of the cold water.

The various features of novelty characterizing my invention are pointed out with particularity in the claims annexed to and forming a part of this specification. For a better understanding of the invention, however, and of the advantages possessed by it, reference should be had to the accompanying drawings and descriptive matter in which I have illustrated and described a preferred form in which my invention may be embodied.

Of the drawings: Figure 1 is a sectional elevation of a valve for supplying a mixture of hot and cold water for bath or lavatory purposes; Fig. 2 is a somewhat diagrammatic representation, showing the relative arrangement of the plungers and the passages in which they work when the valve is in its fully closed position; Figs. 3, 4, 5, 6 and 7 are views taken similarly to Fig. 2, illustrating the changes in the condition of the parts as the plungers are progressively shifted from the closed position shown in Fig. 2 into the position in which the maximum flow of hot water may occur; Fig. 8 is an inverted plan with the casing in section on the line 8—8 of Fig. 1, and with the flow controlling plungers removed from the crosshead by which they are normally supported; and Fig. 9 is a section taken on the line 9—9 of Fig. 1.

The valve shown in Fig. 1 is of a type commonly employed for delivering a mixture of hot and cold water for bath and lavatory purposes. As shown, the valve casing A is formed with two oppositely disposed inlet chambers A' and A². The chamber A' is intended to receive cold water and the chamber A² hot water. The chambers A' and A² are connected by parallel cylindrical passages, formed respectively in the bushings or valve seat members B and b, to a common outlet chamber A³, from which leads the outlet port A⁴. The flow through each of the bushings B and b is controlled by a corresponding plunger D or d. These plungers are attached to a crosshead C, by means of the threaded plunger extensions D⁵ and d⁵, respectively, which are screwed into corresponding threaded sockets in the member C. The crosshead C comprises a portion formed with a threaded socket C' receiving the threaded inner end of the valve operating stem F'. The latter passes through a stuffing box carried in the bonnet portion $A^5$ of the valve casing, and has provisions E', at its outer end, for the attachment of a handle by means of which the stem may be rotated and the plungers D and $d$ thereby moved axially in the bushings B and $b$, respectively, through which they extend. As shown, valve disks or washers $D^4$ and $d^4$ at the upper ends of the plungers D and $d$ are adapted to bear, respectively, against the valve seats B' and $b'$ formed each by a rib on the upper end of the corresponding bushing B or $b$ at the margin of the passage through the latter, when the valve mechanism is in the fully closed condition shown in Fig. 1.

The plunger D is formed with a spider-like or ribbed stem portion D', which serves to guide the plunger in its axial movement in the bushing B, but does not obstruct the flow through the latter. At its lower end the plunger D is formed with a cylindrical cut off portion $D^2$ of a diameter to fit snugly in the bore of the bushing B, and terminating in an upper edge $D^3$, which is in the form of one turn of a helix. The plunger $d$ is provided with a spider-like or ribbed guiding portion $d'$, and with a cylindrical cut off portion $d^2$ at the upper end of the plunger. The cut off portion $d^2$ terminates in a lower cut off edge $d^3$ in the form of one turn of a helix. It will be understood, of course, that I use the terms "upper" and "lower" in connection with the plungers solely with reference to the particular illustration of Fig. 1. It is, of course, immaterial which side of the valve, as a whole, is uppermost.

In the fully closed position of the valve shown in Figs. 1 and 2, the cut off portion $d^2$ projects into the upper end of the axial passage in the bushing $b$ an appreciable distance, while the cut off portion $D^2$ of the plunger D is a similar distance below the lower end of the bushing B. As the plungers D and $d$ are raised, the uppermost point in the helical edge $D^3$ is brought to the level of the lower end of the bushing B at the same time that the uppermost point in the edge $d^3$ is brought to the level of the upper end of the axial passage through the bushing $b$. This is the condition of the apparatus diagrammatically shown in Fig. 3. It should be explained that Figs. 2 to 7, inclusive, are diagrammatic representations in which the surfaces of the cylindrical cut off portions $D^2$, $d^2$ of the plungers D, $d$ are shown as developed surfaces, so that the triangular space $D^{10}$ in Fig. 3, for instance, is the entire discharge orifice between the edge $D^3$ of the cylindrical cut off portion $D^2$ and the lower end of the bushing B. As the plunger D is raised from the position shown in Fig. 3, the orifice $D^{10}$ progressively diminishes in area, but without change in shape, until finally this orifice disappears, when the plunger occupies the position shown in Fig. 7. Similarly, as the plunger $d$ is moved upward from the position shown in Fig. 3, the triangular hot water orifice $d^{10}$ between the cut off edge $d^3$ and the upper end of the axial passage in the bushing $b$ comes into existence and progressively increases in area, but without changing shape, until it reaches its maximum area in the position shown in Fig. 7. While the plungers are being moved from the position shown in Fig. 2 into the position shown in Fig. 3, the flow of cold water through the bushing B is not regulated by the cut off portion $d^2$ of the plunger, but is controlled by the size of the orifice between the valve seat B' and the valve portion $D^4$. The parts should be so proportioned that the flow of cold water will reach its maximum when the parts occupy the position shown in Fig. 3.

When the plungers are operated by a threaded spindle, as in Fig. 1, it is ordinarily practically feasible and desirable to give the spindle less than one complete turn. Moreover, a portion of the axial movement of the plungers, namely, that required to carry the parts from the position shown in Fig. 2 into the position shown in Fig. 3, is not effective in bringing about the temperature graduation of the flow mixture. Inasmuch as the orifices $D^{10}$, $d^{10}$ do not change in shape during the throttling strokes of the plungers D and $d$, namely, in the movements of the latter between the positions shown in Figs. 3 and 7, the flow through these orifices remains substantially constant and the flow through each of the orifices $D^{10}$ and $d^{10}$ is approximately proportional at all times to the area of the orifices. This makes it possible to effect gradual and definite changes in the ratio of hot and cold water in the mixture, notwithstanding the relatively slight total axial movements which it is possible in practice to impart to the plungers.

With a valve of the general type illustrated, it is highly desirable to prevent the assembly of the valve parts with the two flow controlling plungers interchanged so that the one which should control the flow of cold water extends through the port through which the hot water passes into the mixing chamber. Should the valve be thus wrongly assembled, the maximum flow of hot water occurs on the initial opening movement of the valve, and the person using the valve is liable to be badly scalded. To prevent all possibility of this improper assembly of the valve parts, I form the threaded plunger extensions $D^5$ and $d^5$ so that each will fit one only of the two threaded sockets in the crosshead C. For instance, I make the extension $D^5$, and the socket in which it fits, smaller in diameter than the other extension $d^5$ and the crosshead socket in which the latter fits; and I make the thread on the extension $D^5$ finer in pitch than the thread on the extension $d^5$. In addition, I provide means, as the rib $C^2$ on the crosshead C and the coöperating slot $A^6$ in the bonnet $A^5$, to insure that the crosshead and bonnet $A^5$ are always assembled in a fixed angular adjustment; and to insure the same result with respect to the casing body A and the bonnet $A^5$, I form the one with a lug $A^7$ and the other with a corresponding notch or recess $A^8$. As shown, the casing body A and bonnet $A^5$ are detachably secured together by the nut E. With the simple provisions just described it is impossible to assemble the valve parts with the plungers D and $d$ working in the wrong ports. At the same time the valve may be readily taken apart and reassembled as to permit rewashering; i. e., the replacement of the disks $D^4$ and $d^4$.

While in accordance with the provision of the statutes, I have illustrated and described the best form of my invention now known to me, it will be apparent to those skilled in the art that changes may be made in the form of apparatus disclosed without departing from the spirit of my invention, and that under some conditions certain features of my invention may be used without a corresponding use of other features.

Having now described my invention, what I claim as new and desire to secure by Letters Patent, is:

1. In a mixing valve, the combination with a valve casing having two inlet chambers and an outlet chamber and having the outlet chamber connected to each inlet chamber by a corresponding passage, of a pair of plungers one mounted in each of said passages and each formed with a cylindrical cut off portion terminating in a cut off edge slightly inclined to the adjacent end edge of the wall of the passage in which the plunger works, and means for simultaneously moving said plungers axially in said passages, the parts being so relatively arranged that, as the plungers are axially adjusted in said passages, the two orifices, one between each of said cut off edges and the adjacent end edge of the wall of the said passage in which the plunger works, will vary inversely in area while each remains of the same triangular shape.

2. In a mixing valve, the combination with a valve casing having two inlet chambers and an outlet chamber and having the outlet chamber connected to each inlet chamber by a corresponding passage, of a pair of plungers one mounted in each of said passages and each formed with a cylindrical cut off portion terminating in a helical edge making one turn about the axis of the plunger, and means for simultaneously moving said plungers axially in said passages, the parts being so relatively arranged that, as the plungers are axially adjusted in said passages, the two orifices, one between each of said cut off edges and the adjacent end edge of the wall of the passage in which the plunger works, will vary inversely in area while each remains of the same triangular shape.

WILLARD A. SPEAKMAN.

Witnesses:
THOMAS H. BUCKLEY,
HARRY E. SPEAKMAN.